(12) United States Patent
Bernt et al.

(10) Patent No.: US 12,675,592 B2
(45) Date of Patent: Jul. 7, 2026

(54) SYSTEM AND METHOD FOR OPTIMIZED METRIC DISPLAY

(71) Applicant: Salesforce, Inc., San Francisco, CA (US)

(72) Inventors: Christopher Bernt, San Francisco, CA (US); Shanti Camper Singh, Bellevue, WA (US); Chetan Jayadevaiah, Remote, KS (US); Siddharth Patel Aka Khunt, San Francisco, CA (US); Rebecca Greenberg, San Francisco, CA (US); Peter Wang, Dublin, CA (US); Lingyi Wang, Kirkland, WA (US)

(73) Assignee: Salesforce, Inc.

( * ) Notice: Subject to any disclaimer, the term of this patent is extended or adjusted under 35 U.S.C. 154(b) by 196 days.

(21) Appl. No.: 18/395,354

(22) Filed: Dec. 22, 2023

(65) Prior Publication Data

US 2025/0209193 A1     Jun. 26, 2025

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC .............. G06F 21/6218; G06F 21/604; G06F 2221/2141
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Amir Mehrmanesh
*Assistant Examiner* — Aayush Aryal
(74) *Attorney, Agent, or Firm* — Ingrassia Fisher & Lorenz, LLP

(57) ABSTRACT

A method includes: receiving, from a user device, a user request for a graphical user interface (GUI) page containing a plurality of calculated performance indicators that are derived from entity data stored in a secured database system; retrieving a first listing of objects from the entity data containing information for use in calculating the performance indicators; filtering the first listing of objects based on user scope to identify first objects from the first listing of objects that are within scope; generating a first query to retrieve objects identified in the first listing of objects from the database system; instructing the database system via the first query to skip security measures directed to ensuring user access rights to the first objects; calculating the performance indicators based on retrieved objects; generating the GUI page containing the plurality of calculated performance indicators; and signaling the user device to display the generated GUI page.

20 Claims, 5 Drawing Sheets

(56)                References Cited

U.S. PATENT DOCUMENTS

| | | | |
|---|---|---|---|
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,219,775 B2 * | 12/2015 | Cinarkaya | G06F 16/282 |
| 10,579,445 B2 * | 3/2020 | Oravivattanakul | G06F 9/544 |
| 10,776,099 B2 * | 9/2020 | Duvur | G06F 8/71 |
| 11,755,760 B2 * | 9/2023 | Balan | H04L 63/101 726/1 |
| 12,028,226 B1 * | 7/2024 | Bhave | H04L 43/14 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0177744 A1 | 7/2009 | Marlow et al. | |
| 2011/0247051 A1 | 10/2011 | Bulumulla et al. | |
| 2012/0042218 A1 | 2/2012 | Cinarkaya et al. | |
| 2012/0162265 A1 * | 6/2012 | Heinrich | G06F 3/04883 345/173 |
| 2012/0173485 A1 * | 7/2012 | Kothule | G06F 16/27 707/634 |
| 2012/0197941 A1 * | 8/2012 | Metzger | G06F 16/21 707/783 |
| 2012/0218958 A1 | 8/2012 | Rangaiah | |
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 * | 9/2013 | Cinarkaya | G06F 16/9566 709/213 |
| 2014/0157142 A1 * | 6/2014 | Heinrich | G06F 3/0412 715/744 |

(56) References Cited

U.S. PATENT DOCUMENTS

| | | | |
|---|---|---|---|
| 2016/0103862 A1* | 4/2016 | Boe | G06F 16/245 |
| | | | 707/744 |
| 2017/0116130 A1* | 4/2017 | Sundaravaradan | |
| | | | G06F 16/2453 |
| 2017/0116135 A1* | 4/2017 | Sundaravaradan | |
| | | | G06F 16/9574 |
| 2018/0107697 A1* | 4/2018 | Tariq | G06F 16/24539 |
| 2020/0089907 A1* | 3/2020 | Lee | G06F 21/6227 |
| 2020/0364365 A1* | 11/2020 | Lee | G06F 16/245 |
| 2021/0081427 A1* | 3/2021 | Obembe | G06F 16/252 |
| 2022/0004285 A1* | 1/2022 | Goswami | G06F 3/0483 |
| 2024/0020232 A1* | 1/2024 | Heublein | G06F 12/0862 |

* cited by examiner

200

210

Data Management System

202

208 Server

212

Client App

214

206

Network

204

User Device

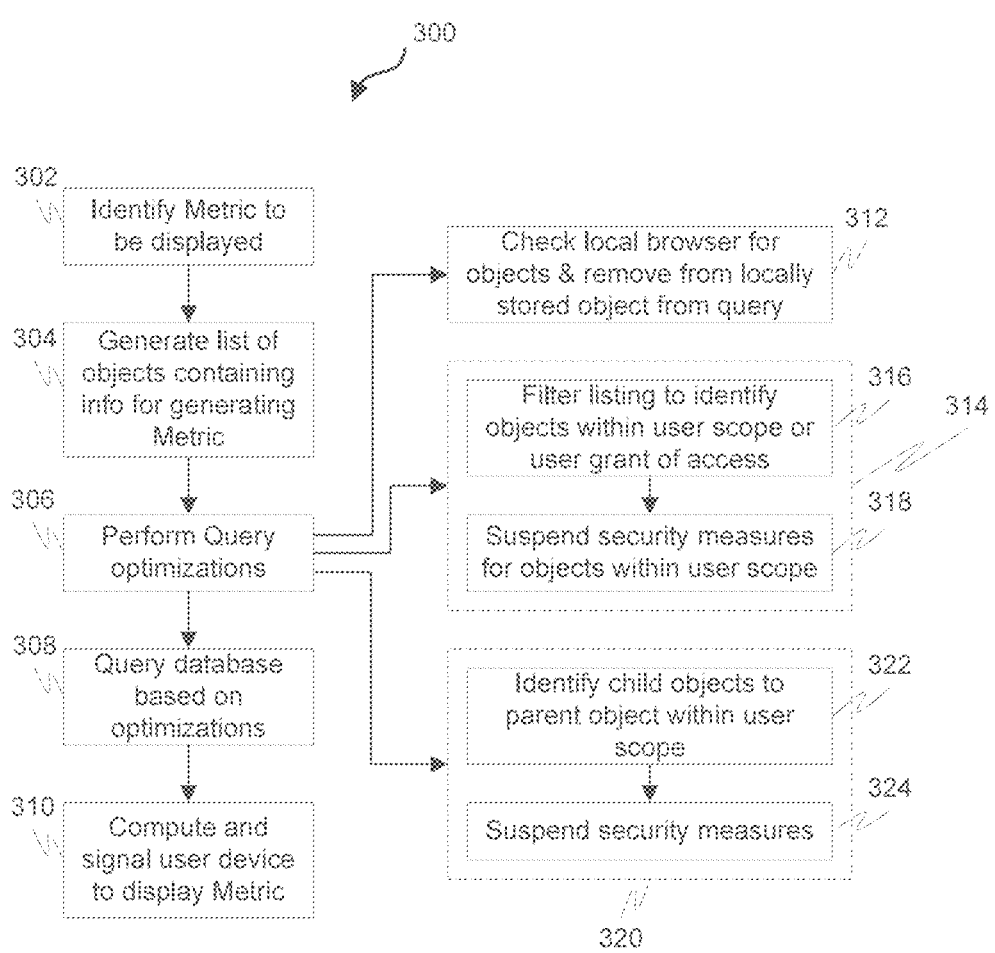

302 Identify Metric to be displayed

304 Generate list of objects containing info for generating Metric

306 Perform Query optimizations

308 Query database based on optimizations

310 Compute and signal user device to display Metric

312 Check local browser for objects & remove from locally stored object from query 316 Filter listing to identify objects within user scope or user grant of access

314

318 Suspend security measures for objects within user scope

322 Identify child objects to parent object within user scope

324 Suspend security measures

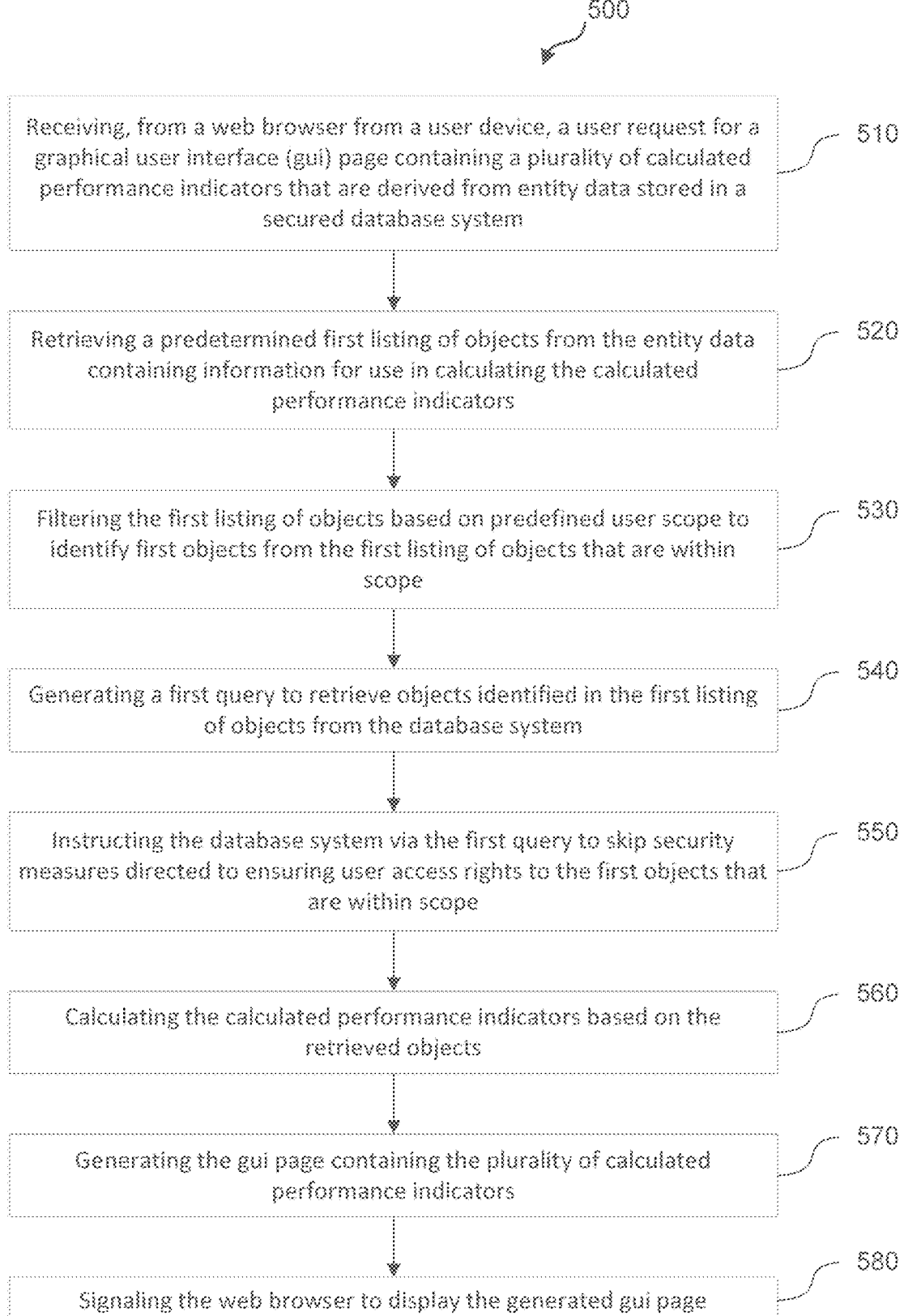

*500*

Receiving, from a web browser from a user device, a user request for a graphical user interface (gui) page containing a plurality of calculated performance indicators that are derived from entity data stored in a secured database system          510

Retrieving a predetermined first listing of objects from the entity data containing information for use in calculating the calculated performance indicators          520

Filtering the first listing of objects based on predefined user scope to identify first objects from the first listing of objects that are within scope          530

Generating a first query to retrieve objects identified in the first listing of objects from the database system          540

Instructing the database system via the first query to skip security measures directed to ensuring user access rights to the first objects that are within scope          550

Calculating the calculated performance indicators based on the retrieved objects          560

Generating the gui page containing the plurality of calculated performance indicators          570

Signaling the web browser to display the generated gui page          580

FIG. 5

SYSTEM AND METHOD FOR OPTIMIZED METRIC DISPLAY

TECHNICAL FIELD

Embodiments of the subject matter described herein relate to multi-tenant computing environments, and more particularly to displaying tenant data in a multi-tenant computing environment.

BACKGROUND

Generating a graphical user interface (GUI) display can be a time consuming process in some computing environments, particularly when the GUI display includes items that must be computed at runtime from data stored in a database system. A viewer of the GUI can be made to wait for various queries to complete before items can be computed for display on the GUI. A computing system that could speed up the display of a GUI display would be advantageous and could improve user experience.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a method in a user application, including: receiving, from a user device, a user request for a graphical user interface (GUI) page containing a plurality of calculated performance indicators that are derived from entity data stored in a secured database system; retrieving a predetermined first listing of objects from the entity data containing information for use in calculating the calculated performance indicators; filtering the first listing of objects based on predefined user scope to identify first objects from the first listing of objects that are within scope; generating a first query to retrieve objects identified in the first listing of objects from the database system; instructing the database system via the first query to skip security measures directed to ensuring user access rights to the first objects that are within scope; calculating the calculated performance indicators based on the retrieved objects; generating the GUI page containing the plurality of calculated performance indicators; and signaling the user device to display the generated GUI page.

In some aspects, the techniques described herein relate to a data management system including: a secured database system including storage media and configured to securely store entity data; and a server component including one or more processors configured by programming instructions on non-transitory computer readable media, the server component configured to: receive, from a user device over a network, a user request for a graphical user interface (GUI) page containing a plurality of calculated performance indicators that are derived from the entity data stored in the secured database system; retrieve a predetermined first listing of objects from the entity data containing information for use in calculating the calculated performance indicators; filter the first listing of objects based on predefined user scope to identify first objects from the first listing of objects that are within scope; generate a first query to retrieve objects identified in the first listing of objects from the database system; instruct the database system via the first query to skip security measures directed to ensuring user access rights to the first objects that are within scope; calculate the calculated performance indicators based on the retrieved objects; generate the GUI page containing the plurality of calculated performance indicators; and signal the user device to display the generated GUI page.

In some aspects, the techniques described herein relate to a server system including: controller including one or more processors configured by programming instructions on non-transitory computer readable media, the controller configured to: receive, from a user device over a network, a user request for a graphical user interface (GUI) page containing a plurality of calculated performance indicators that are derived from the entity data stored in the secured database system; retrieve a predetermined first listing of objects from the entity data containing information for use in calculating the calculated performance indicators; filter the first listing of objects based on predefined user scope to identify first objects from the first listing of objects that are within scope; generate a first query to retrieve objects identified in the first listing of objects from the database system; instruct the database system via the first query to skip security measures directed to ensuring user access rights to the first objects that are within scope; calculate the calculated performance indicators based on the retrieved objects; generate the GUI page containing the plurality of calculated performance indicators; and signal the user device to display the generated GUI page.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 3 is a process flow chart depicting an example process for displaying a calculated metric, in accordance with various embodiments.

FIG. 5 is a process flow chart depicting an example process for providing a GUI page with Metrics, in accordance with various embodiments.

DETAILED DESCRIPTION

The following detailed description is merely exemplary in nature and is not intended to limit the invention or the application and uses of the invention. As used herein, the words "exemplary" and "example" mean "serving as an example, instance, or illustration." Thus, any embodiment described herein as "exemplary" or "example" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
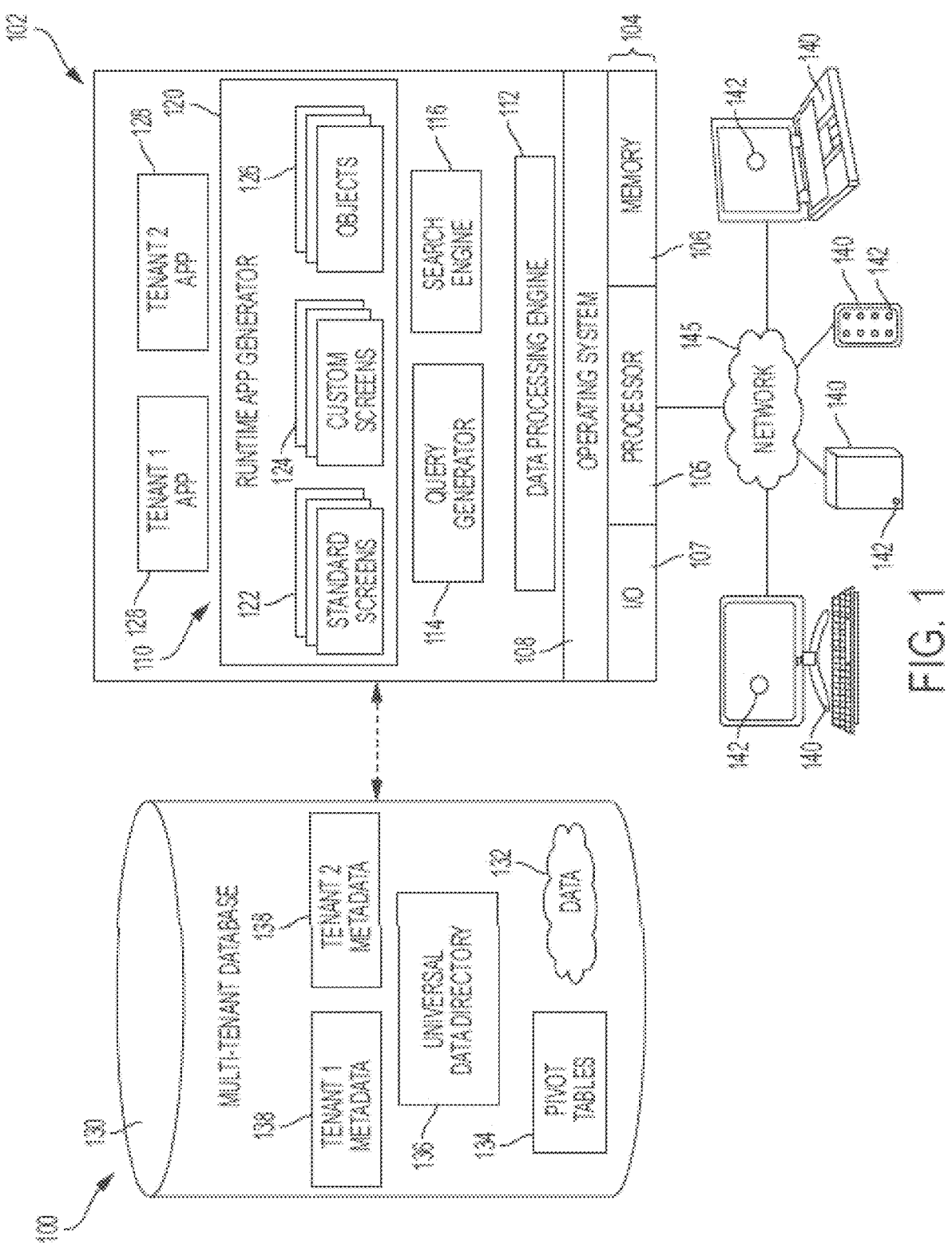
FIG. 1 is a schematic block diagram of an example multi-tenant computing environment in which features of the disclosed embodiments can be implemented in accordance with some of the disclosed embodiments.

FIG. 1 is a schematic block diagram of an example multi-tenant computing environment in which features of the disclosed embodiments can be implemented in accordance with the disclosed embodiments. As shown in FIG. 1, an exemplary cloud-based solution may be implemented in the context of a multi-tenant system 100 including a server 102 that supports applications 128 based upon data 132 from a database 130 that may be shared between multiple tenants, organizations, or enterprises, referred to herein as a multi-tenant database. The multi-tenant system 100 can be shared by many different organizations, and handles the storage of, and access to, different metadata, objects, data, and applications across disparate organizations. In one embodiment, the multi-tenant system 100 can be part of a database system, such as a multi-tenant database system.

The multi-tenant system 100 can provide applications and services and store data for any number of organizations. Each organization is a source of metadata and data associated with that metadata that collectively make up an application. In one implementation, the metadata can include customized content of the organization (e.g., customizations done to an instance that define business logic and processes for an organization). Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects.

The multi-tenant system 100 allows users of user systems 140 to establish a communicative connection to the multi-tenant system 100 over a network 145 such as the Internet or any type of network described herein. Based on a user's interaction with a user system 140, the application platform 110 accesses an organization's data (e.g., records held by an object) and metadata that is stored at one or more database systems 130, and provides the user system 140 with access to applications based on that data and metadata. These applications are executed or run in a process space of the application platform 110 will be described in greater detail below. The user system 140 and various other user systems (not illustrated) can interact with the applications provided by the multi-tenant system 100. The multi-tenant system 100 is configured to handle requests for any user associated with any organization that is a tenant of the system. Data and services generated by the various applications 128 are provided via a network 145 to any number of user systems 140, such as desktops, laptops, tablets, smartphones or other client devices, Google Glass™, and any other computing device implemented in an automobile, aircraft, television, or other business or consumer electronic device or system, including web clients.

Each application 128 is suitably generated at run-time (or on-demand) using a common application platform 110 that securely provides access to the data 132 in the database 130 for each of the various tenant organizations subscribing to the system 100. The application platform 110 has access to one or more database systems 130 that store information (e.g., data and metadata) for a number of different organizations including user information, organization information, custom information, etc. The database system 130 can include a multi-tenant database system 130 as described with reference to FIG. 1, as well as other databases or sources of information that are external to the multi-tenant database system 130 of FIG. 1. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that share access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business, or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area, or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The server 102, application platform 110 and database systems 130 can be part of one backend system. Although not illustrated, the multi-tenant system 100 can include other backend systems that can include one or more servers that work in conjunction with one or more databases and/or data processing components, and the application platform 110 can access the other backend systems.

The multi-tenant system 100 includes one or more user systems 140 that can access various applications provided by the application platform 110. The application platform 110 is a cloud-based user interface. The application platform 110 can be any sort of software application or other data processing engine that generates the virtual applications 128 that provide data and/or services to the user systems 140. In a typical embodiment, the application platform 110 gains access to processing resources, communications interfaces, and other features of the processing hardware 104 using any sort of conventional or proprietary operating system 108. The virtual applications 128 are typically generated at run-time in response to input received from the user systems 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components, or other modules as desired.

The runtime application generator 120 dynamically builds and executes the virtual applications 128 in response to specific requests received from the user systems 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its user system 140, as appropriate.

The runtime application generator 120 suitably interacts with the query generator 114 to efficiently obtain multi-tenant data 132 from the database 130 as needed in response to input queries initiated or otherwise provided by users of the user systems 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions, and other constructs) of each respective object 126 and the various fields associated therewith.

Still referring to FIG. 1, the data and services provided by the server 102 can be retrieved using any sort of personal computer, mobile telephone, tablet or other network-enabled user system 140 on the network 145. In an exemplary embodiment, the user system 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the user system 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing. In various embodiments, the server 102 is enhanced by one or more virtual applications 128 to speed up the display of analyzed data in a display of a user system 140.

As noted above, the virtual application 128 may contain Java, ActiveX, or other content that can be presented using conventional client software running on the user system 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

Objects, Records, and Archive Records

In one embodiment, the multi-tenant database system 130 can store data in the form of records and customizations. As used herein, the term "record" can refer to a particular occurrence or instance of a data object that is created by a user or administrator of a database service and stored in a database system, for example, about a particular (actual or potential) business relationship or project.

An object can refer to a structure used to store data and associated metadata along with a globally unique identifier (called an identity field) that allows for retrieval of the object. In one embodiment implementing a multi-tenant database, all of the records for the tenants have an identifier stored in a common table. Each object comprises a number of fields. A record has data fields that are defined by the structure of the object (e.g., fields of certain data types and purposes). An object is analogous to a database table, fields of an object are analogous to columns of the database table, and a record is analogous to a row in a database table. Data is stored as records of the object, which correspond to rows in a database. The terms "object" and "entity" are used interchangeably herein. Objects not only provide structure for storing data, but can also power the interface elements that allow users to interact with the data, such as tabs, the layout of fields on a page, and lists of related records. Objects can also have built-in support for features such as access management, validation, formulas, triggers, labels, notes and attachments, a track field history feature, security features, etc. Attributes of an object are described with metadata, making it easy to create and modify records either through a visual interface or programmatically.

A record can also have custom fields defined by a user. A field can be another record or include links thereto, thereby providing a parent-child relationship between the records. Customizations can include custom objects and fields, Apex Code, Visualforce, Workflow, etc.

Examples of objects include standard objects, custom objects, and external objects. A standard object can have a pre-defined data structure that is defined or specified by a database service or cloud computing platform. A standard object can be thought of as a default object. For example, in one embodiment, a standard object includes one or more pre-defined fields that are common for each organization that utilizes the cloud computing platform or database system or service.

A few non-limiting examples of different types of standard objects can include sales objects (e.g., accounts, contacts, opportunities, leads, campaigns, and other related objects); task and event objects (e.g., tasks and events and their related objects); support objects (e.g., cases and solutions and their related objects); salesforce knowledge objects (e.g., view and vote statistics, article versions, and other related objects); document, note, attachment objects and their related objects; user, sharing, and permission objects (e.g., users, profiles, and roles); profile and permission objects (e.g., users, profiles, permission sets, and related permission objects); record type objects (e.g., record types and business processes and their related objects); product and schedule objects (e.g., opportunities, products, and schedules); sharing and team selling objects (e.g., account teams, opportunity teams, and sharing objects); customizable forecasting objects (e.g., includes forecasts and related objects); forecasts objects (e.g., includes objects for collaborative forecasts); territory management (e.g., territories and related objects associated with territory management); process objects (e.g., approval processes and related objects); content objects (e.g., content and libraries and their related objects); chatter feed objects (e.g., objects related to feeds); badge and reward objects; feedback and performance cycle objects, etc. For example, a record can be for a business partner or potential business partner (e.g., a client, vendor, distributor, etc.) of the user, and can include an entire company, subsidiaries, or contacts at the company. As another example, a record can be a project that the user is working on, such as an opportunity (e.g., a possible sale) with an existing partner, or a project that the user is trying to work on.

By contrast, a custom object can have a data structure that is defined, at least in part, by an organization or by a user/subscriber/admin of an organization. For example, a custom object can be an object that is custom defined by a user/subscriber/administrator of an organization, and includes one or more custom fields defined by the user or the particular organization for that custom object. Custom objects are custom database tables that allow an organization to store information unique to their organization. Custom objects can extend the functionality that standard objects provide.

In one embodiment, an object can be a relationship management entity having a record type defined within platform that includes a customer relationship management (CRM) database system for managing a company's relationships and interactions with their customers and potential customers. Examples of CRM entities can include, but are not limited to, an account, a case, an opportunity, a lead, a project, a contact, an order, a price book, a product, a solution, a report, a forecast, a user, etc. For instance, an opportunity can correspond to a sales prospect, marketing project, or other business related activity with respect to which a user desires to collaborate with others.

External objects are objects that an organization creates that map to data stored outside the organization. External objects are like custom objects, but external object record data is stored outside the organization. For example, data that is stored on premises in an enterprise resource planning (ERP) system can be accessed as external objects in real time via web service callouts, instead of copying the data into the organization.

Figure 2:
FIG. 2 is a block diagram of an example network environment, in accordance with various embodiments.

FIG. 2 is a block diagram of an example network environment 200, in accordance with various embodiments. The example network environment 200 includes a data management system 202 that communicates with a user device 204 (e.g., user system 140) through a network 206 (e.g., network 145) such as the Internet or any type of network described herein. The data management system 202 includes a server 208 (e.g., server 102 or some other server) and a database system 210 (e.g., multi-tenant database 130 or some other database system). The database system 210 includes storage hardware and software and is configured to securely isolate data and services provided from the server 208 to a specific tenant from data and services provided to other tenants. The database system 210 allows different sets of users to share functionality and hardware resources without necessarily sharing any of the data belonging to or otherwise associated with other organizations.

The server 208, includes one or more processors and non-transitory computer readable media. The server 208 is configured by programming instructions on the non-transitory computer readable media to perform server functions such as those described with respect to server 102. The example server 208 is further configured by programming instructions to include a client application 212 (e.g., a virtual application 128). The client application 212 is configured to generate one or more display screens for display on a user device 204, for example in a web browser. The non-transitory computer readable media further includes data files, such as a data file 214 that can be used to store data for use by the client application 212.

The one or more display screens generated by the client application 212 can display different sets of Metrics that are calculated from data stored in the database system 210. In various embodiments, the metrics include performance indicators, and in some embodiments the metrics include key performance indicators (KPIs), such as a sum of deals closed in a current fiscal quarter, a sum of deals pushed out of a current fiscal quarter, a sum of deals whose amounts were increased within a given time frame, and others.

The generation and display of the display screens with the Metrics may be time intensive and result in the display of the display screens in user web browsers to not be as timely as desired. The timing involved in generating the display screens with the Metrics may include database access time for accessing the underlying data from which the Metrics are derived, Metric generation time, and display generation time, among others. In various embodiments, the example client application 212 is configured to reduce the timing involved in generating display screens with Metrics.

In various embodiments, the example client application 212 has been configured to take advantage of a number of optimizations to reduce data access time from the database system 210 to speed up the generation and display of display screens. In various embodiments, the example client application 212 has been configured by the programming instructions to speed up data access from the database system 210 by eliminating some unnecessary security measures aimed at securely isolating entity data belonging to a specific tenant from entity data belonging to a different tenant.

To generate display screens with Metrics, the example client application 212 is configured to retrieve a predetermined listing of objects from the database system 210 that contains information for use in calculating performance indicators that make up the Metrics. The example client application 212 is configured to use scopes to eliminate some unnecessary security measures. Scopes define the type of protected resources that a user of the client application 212 is authorized to access from the database system 210. The scopes are assigned to the client application 212 and are included with authorization tokens during the authorization flow for authorizing a user to access the client application 212.

The example client application 212 is configured to filter the listing of objects based on user scope to identify objects from the listing of objects that are within scope. The example client application 212 is configured to generate a query to retrieve the objects that are within scope from the database system 210. The client application 212 is configured to instruct the database system 210 via the query to skip security measures directed to ensuring user access rights to the objects that are within scope. Thus, the retrieval of information for use in calculating performance indicators that make up the Metrics can be sped up by foregoing unnecessary security measures since user access rights to the objects containing the information had already been established.

To cause the display of Metrics via a web browser, the example client application 212 is further configured to calculate the performance indicators based on the retrieved objects, generate a GUI page containing the calculated performance indicators, and signal the web browser at the user device 204 to display the generated GUI page.

Another optimization, of which the example client application 212 has been configured to take advantage to reduce data access time from the database system 210 to speed up the generation and display of display screens, involves the temporary granting of rights of a user whose scope allows access to objects that provide information for generating the performance indicators to a user whose scope does not allow access to objects that provide information for generating the performance indicators. In various embodiments the data file 214 includes a granted rights storage file. In various embodiments, the client application 212 is configured to allow a user whose scope allows access to objects that provide information for generating the performance indicators to grant temporary access to a user whose scope does not allow access to objects that provide information for generating the performance indicators. In various embodiments, the client application 212 is configured to store identification information for users who have been granted temporary access rights in the granted rights storage file in the data file 214.

Thus, to generate display screens with Metrics, the example client application 212 is configured to retrieve a predetermined listing of objects from the database system 210 that contains information for use in calculating performance indicators that make up the Metrics, check to determine if the objects are within the scope assigned to the user of the client application 212, and if not check to determine whether the user has been temporarily granted access rights by checking the granted rights storage file in the data file 214. When the user has been temporarily granted access rights, the example client application 212 is configured to filter the listing of objects based on user scope to identify objects from the listing of objects that are within scope. The example client application 212 is configured to generate a query to retrieve the objects that are within scope from the database system 210. The client application 212 is configured to instruct the database system 210 via the query to skip security measures directed to ensuring user access rights to the objects that are within scope. Thus, the retrieval of information for use in calculating performance indicators that make up the Metrics can be sped up by foregoing unnecessary security measures since user access rights to the objects containing the information had already been established.

Another optimization, of which the example client application 212 has been configured to take advantage to reduce data access time from the database system 210 to speed up the generation and display of display screens, involves using local browser storage to temporarily store retrieved objects that are otherwise uncacheable. An object may not be suitable for caching, e.g., uncacheable, when the information contained in the object is subject to change. In such case, it may be desirable to temporarily store the object during a session when it may be later needed for providing information for calculating further performance indicators and the information contained therein is not likely to change during the session.

In various embodiments, the client application 212 is configured to determine whether a retrieved object is cacheable and store the retrieved object as a non-cacheable object within web browser memory of the web browser of the user device 204 when the retrieved object is not cacheable. In various embodiments, the client application 212 is further configured to receive, from the user device 204, a user request for a second GUI page containing additional performance indicator information regarding at least one of the calculated performance indicators, generate a second listing of objects from the database system 210 containing information for use in calculating the additional performance indicator information regarding the at least one of the calculated performance indicators, determine whether the second listing of objects includes the non-cacheable object that was stored in the web browser memory, retrieve the non-cacheable object from the web browser memory, calculate the additional performance indicator information based on the retrieved non-cacheable object, generate the second GUI page containing the additional performance indicator information, and signal the web browser to display the second GUI page.

In some embodiments, the client application 212 is further configured to: receive, from the user device, a second user request for a second GUI page containing additional performance indicator information regarding at least one of the calculated performance indicators; generate a second listing of objects from the entity data containing information for use in calculating the additional performance indicator information regarding the at least one of the calculated performance indicators; determine whether the second listing of objects includes the non-cacheable object that was stored in the web browser memory; filter the second listing of objects to remove any non-cacheable object that was stored in the web browser memory and to identify second objects that are within scope based on the predefined user scope; retrieve the non-cacheable object from the web browser memory; generate a second query to retrieve from the database system objects from the filtered second listing; instruct the database system via the second query to skip security measures directed to ensuring user access rights to the first and second objects that are within scope; calculate the additional performance indicator information based on the objects retrieved from the second query and the non-cacheable object; generate the second GUI page containing the additional performance indicator information; and signal the web browser to display the second GUI page.

Another optimization, of which the example client application 212 has been configured to take advantage to reduce data access time from the database system 210 to speed up the generation and display of display screens, involves treating child objects as in scope when the parent objects of the child objects are in scope. In various embodiments, the client application 212 is configured to determine, when determining whether objects in a listing of objects are within scope, whether the object is a child object to a parent object that is in scope. When filtering the listing of objects to identify objects that are within scope based on user scope, the client application 212 is configured to identify child objects that otherwise might not be in scope as being in scope when the object is a child object to a parent object that is in scope.

In various embodiments, the example client application 212 is configured to generate a query to retrieve from the database system objects from the filtered listing that include objects that are within scope and objects that are child objects to parent objects that are within scope; and instruct the database system via the query to skip security measures directed to objects that are within scope and objects that are child objects to parent objects that are within scope. In various embodiments, the example client application 212 is configured to calculate performance indicator information based on objects that are within scope and objects that are child objects to parent objects that are within scope; generate a GUI page containing the performance indicator information; and signal the web browser to display the GUI page.

FIG. 3 is a process flow chart depicting an example process 300 for displaying a calculated metric, in accordance with various embodiments. The order of operation within the example process 300 is not limited to the sequential execution as illustrated in the figure, but may be performed in one or more varying orders as applicable and in accordance with the present disclosure.

At step 302, the example process 300 includes identifying a Metric to be displayed. The Metric to be displayed may include a plurality of performance indicators. In various embodiments, the performance indicators are KPIs.

At step 304, the example process 300 includes generating a list of objects containing information for generating the Metric and at step 306, the example process 300 includes performing query optimizations. In various embodiments the query optimizations are directed to reducing database access time by eliminating certain security checks. In various embodiments, the query optimizations include, at step 312, checking a local browser on the user device for objects that have been locally stored and removing locally stored objects from the list of objects.

In various embodiments, the query optimizations include, at step 314, filtering the objects for a query based on user scopes. In various embodiments, filtering the objects for a query based on user scopes involves, at step 316, filtering the objects for a query based on the user scope of the user of the user device or filtering the objects for a query based on the user of the user device having been granted access rights to the objects by a user with user scope to access the objects. In various embodiments, filtering the objects for a query based on user scopes also involves, at step 318, suspending security measures for objects within scope determined in step 316.

In various embodiments, the query optimizations include, at step 320, filtering the objects for a query based on whether an object is a child object to a parent object that is within scope. In various embodiments, when an object is not otherwise within scope but is a child object to a parent object that is within scope, the query optimizations include, at step 322, identifying child objects to parent objects that are within scope and, at step 324, suspending security measures, for child objects to parent objects that are within scope.

At step 308, the example process 300 includes querying the database based on the query optimizations. In various embodiments, a query is presented that results in the database returning one or more objects containing information from which the Metric can be determined. In various embodiments, the database returns the one or more objects without performing security checks.

At step 310, the example process 300 includes computing the Metric and signaling the user device to display the Metric. The Metric may be computed based on information from the one or more objects returned by the database. The Metric may be displayed via a web browser on a user device. Signaling the user to display the Metric may include generating a GUI page for display via a web browser and sending the GUI page to the user device.

Figures 4A, 4B:
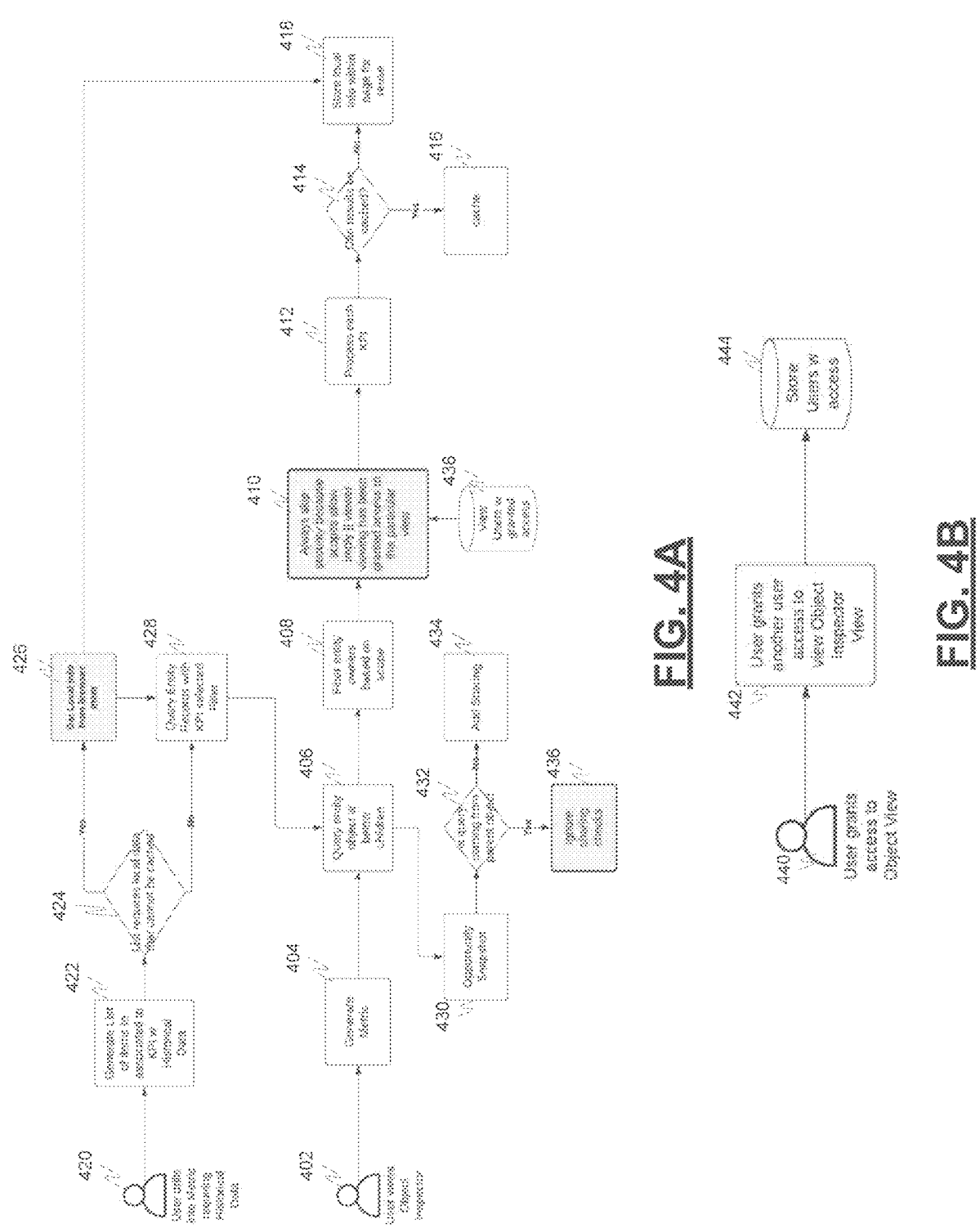
FIG. 4A is flow diagram depicting example operations of a server and database system, in accordance with some embodiments.
FIG. 4B is a flow diagram depicting an example process for granting temporary user access to database objects, in accordance with some embodiments.

FIG. 4A is flow diagram depicting example operations of a server and database system, in accordance with some embodiments. FIG. 4B is a flow diagram depicting an example process for granting temporary user access to database objects, in accordance with some embodiments.

A user, at 402, views a GUI, for example through a browser provided by a user device, which provides access, via a server, to entity data stored in a database system. At 404, the user requests the generation of a Metric that includes one or more KPIs based on the entity data. The server, at 406, generates a query for entity objects from the entity data that contain information for calculating the Metric. At 408, the server filters the entity objects in the query based on scope. The server queries the database system for the filtered entity objects, and at 410, the database system skips security measures when responding to the query because the filtered entity objects are within scope. At 412, the server calculates each KPI using information from the filtered entity objects returned by the database system. At 414, the server determines whether objects resulting from the query may be cached and if any objects are cacheable, the cacheable objects are stored in a cache at 416. If any object is not cacheable, the non-cacheable object is stored in local memory associated with the user web browser for reuse at 418.

At 420, a user requests the server to drill into the Metric to provide additional information regarding the Metric. At 422, the server generates a list of objects for generating the additional information. At 424, the server determines whether the list of objects contains the non-cacheable object stored in local memory associated with the user web browser for reuse. At 426, the server retrieves the non-cacheable object stored in local memory associated with the user web browser when the server determines that the list of objects contains the non-cacheable object. At 428, the server removes the non-cacheable object from the list of objects and queries the database system for entity objects based on the list of objects with the non-cacheable object removed.

At 430, the Metric generation involves the use of child objects. In various embodiments, the child object includes historical data relating to its parent object. At 432, the server determines whether the query for entity objects (at 406) involves a child object to a parent object that is within scope. When the query for entity objects involves a child object to a parent object that is not within scope, the server, at 434, does not instruct the database system to ignore security checks when responding to the query. When the query for entity objects involves a child object to a parent object that is not within scope, the server, at 436, instructs the database system to ignore security checks when responding to the query.

Additionally, at 410, the database system skips security measures when responding to the query when the user has been granted access to the filtered entity objects by a user for whom the filtered entity objects are within scope. The server, at 438, checks a users-with-granted-access-rights store to determine if the database system is to be instructed to skip security measures when responding to the query for the filtered entity objects.

At 440, a user for whom the filtered entity objects are within scope signals to the server that it grants access rights to view the filtered entity objects to a second user. At 442, the server grants access rights to view the filtered entity objects to the second user. At 444, the server stores user identification information for the second user in the users-with-granted-access-rights store.

FIG. 5 is a process flow chart depicting an example process 500 for providing a GUI page with Metrics, in accordance with various embodiments. The order of operation within the example process 500 is not limited to the sequential execution as illustrated in the figure, but may be performed in one or more varying orders as applicable and in accordance with the present disclosure.

At step 510, the example process 500 includes receiving, from a user device, a user request for a graphical user interface (GUI) page containing a plurality of calculated performance indicators that are derived from entity data stored in a secured database system.

At step 520, the example process 500 includes retrieving a predetermined first listing of objects from the entity data containing information for use in calculating the calculated performance indicators.

At step 530, the example process 500 includes filtering the first listing of objects based on predefined user scope to identify first objects from the first listing of objects that are within scope.

At step 540, the example process 500 includes generating a first query to retrieve objects identified in the first listing of objects from the database system.

At step 550, the example process 500 includes instructing the database system via the first query to skip security measures directed to ensuring user access rights to the first objects that are within scope.

At step 560, the example process 500 includes calculating the calculated performance indicators based on the retrieved objects.

At step 570, the example process 500 includes generating the GUI page containing the plurality of calculated performance indicators.

At step 580, the example process 500 includes signaling the user device to display the generated GUI page.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method in a user application, comprising:

receiving, from a user device, a user request for a graphical user interface (GUI) page containing a plurality of calculated performance indicators that are derived from entity data stored in a secured database system;

retrieving a predetermined first listing of objects from the entity data containing information for use in calculating the calculated performance indicators;

filtering the first listing of objects based on predefined user scope to identify first objects from the first listing of objects that are within scope;

generating a first query to retrieve objects identified in the first listing of objects from the database system;

instructing the database system via the first query to skip security measures directed to ensuring user access rights to the first objects that are within scope;

determining whether a retrieved object is cacheable;

storing the retrieved object as a non-cacheable object within user device memory of the user device when the retrieved object is not cacheable;

calculating the calculated performance indicators based on the retrieved objects;

generating the GUI page containing the plurality of calculated performance indicators;

signaling the user device to display the generated GUI page;

receiving, from the user device, a second user request for a second GUI page containing performance indicator information regarding at least one of the calculated performance indicators;

generating a second listing of objects from the entity data containing information for use in calculating the performance indicator information regarding the at least one of the calculated performance indicators;

determining whether the second listing of objects includes the non-cacheable object that was stored in the user device memory;

filtering the second listing of objects to remove any non-cacheable object that was stored in the user device memory and to identify second objects that are within scope based on the predefined user scope;

retrieving the non-cacheable object from the user device memory;

generating a second query to retrieve from the database system objects from the filtered second listing;

instructing the database system via the second query to skip security measures directed to ensuring user access rights to the first objects and the second objects that are within scope; and calculating the performance indicator information based on the objects retrieved from the second query and the non-cacheable object.

2. The method of claim 1, further comprising:

storing the retrieved object in a cache associated with the database system when the retrieved object is cacheable.

3. The method of claim 2, further comprising:

generating the second GUI page containing the performance indicator information; and signaling the user device to display the second GUI page.

4. The method of claim 1, further comprising:

when an object in the first listing of objects is not within scope, determining whether the object is a child object to a parent object that is within scope; and when the child object is in the first listing of objects along with the parent object that is within scope, instructing the database system to skip security measures directed to ensuring user access rights to the child object.

5. The method of claim 4, wherein the child object comprises historical data relating to a parent object.

6. The method of claim 1, further comprising:

receiving instructions from a first user who has access to the objects within scope to temporarily grant access rights to a second user who does not have access to the objects within scope; and storing information indicating a temporary grant of access rights to the second user in an access rights granted file.

7. The method of claim 6, wherein instructing the database system to skip security measures directed to ensuring user access rights further comprises:

instructing the database system to skip security measures directed to ensuring user access rights after determining from the access granted file that a user of the user device has been granted access to the objects within scope.

8. The method of claim 1, wherein the performance indicators comprise key performance indicators (KPI) comprising one or more of: a sum of deals closed in a current fiscal quarter, a sum of deals pushed out of a current fiscal quarter, and a sum of deals whose amounts were increased within a given time frame.

9. A data management system comprising:

a secured database system comprising storage media and configured to securely store entity data; and a server component comprising one or more processors configured by programming instructions on non-transitory computer readable media, the server component configured to:

receive, from a user device over a network, a user request for a graphical user interface (GUI) page containing a plurality of calculated performance indicators that are derived from the entity data stored in the secured database system;

retrieve a predetermined first listing of objects from the entity data containing information for use in calculating the calculated performance indicators;

filter the first listing of objects based on predefined user scope to identify first objects from the first listing of objects that are within scope;

generate a first query to retrieve objects identified in the first listing of objects from the database system;

instruct the database system via the first query to skip security measures directed to ensuring user access rights to the first objects that are within scope;

determine whether a retrieved object is cacheable;

store the retrieved object as a non-cacheable object within user device memory of the user device when the retrieved object is not cacheable;

calculate the calculated performance indicators based on the retrieved objects;

generate the GUI page containing the plurality of calculated performance indicators;

signal the user device to display the generated GUI page;

receive, from the user device, a second user request for a second GUI page containing performance indicator information regarding at least one of the calculated performance indicators;

generate a second listing of objects from the entity data containing information for use in calculating the performance indicator information regarding the at least one of the calculated performance indicators;

determine whether the second listing of objects includes the non-cacheable object that was stored in the user device memory;

filter the second listing of objects to remove any non-cacheable object that was stored in the user device memory and to identify second objects that are within scope based on the predefined user scope;

retrieve the non-cacheable object from the user device memory;

generate a second query to retrieve from the database system objects from the filtered second listing;

instruct the database system via the second query to skip security measures directed to ensuring user access rights to the first objects and the second objects that are within scope; and calculate the performance indicator information based on the objects retrieved from the second query and the non-cacheable object.

10. The data management system of claim 9, wherein the server component is further configured to:

store the retrieved object in a cache associated with the database system when the retrieved object is cacheable.

11. The data management system of claim 10, wherein the server component is further configured to:

generate the second GUI page containing the performance indicator information; and signal the user device to display the second GUI page.

12. The data management system of claim 9, wherein the server component is further configured to:

when an object in the first listing of objects is not within scope, determine whether the object is a child object to a parent object that is within scope; and when the child object is in the first listing of objects along with the parent object that is within scope, instruct the database system to skip security measures directed to ensuring user access rights to the child object.

13. The data management system of claim 9, wherein the server component is further configured to:

receive instructions from a first user who has access to the objects within scope to temporarily grant access rights to a second user who does not have access to the objects within scope; and store information indicating a temporary grant of access rights to the second user in an access rights granted file.

14. The data management system of claim 13, wherein to instruct the database system to skip security measures directed to ensuring user access rights the server component is further configured to:

instruct the database system to skip security measures directed to ensuring user access rights after determining from the access granted file that a user of the user device has been granted access to the objects within scope.

15. A server system comprising:

controller comprising one or more processors configured by programming instructions on non-transitory computer readable media, the controller configured to:

receive, from a user device over a network, a user request for a graphical user interface (GUI) page containing a plurality of calculated performance indicators that are derived from entity data stored in a secured database system;

retrieve a predetermined first listing of objects from entity data containing information for use in calculating the calculated performance indicators;

filter the first listing of objects based on predefined user scope to identify first objects from the first listing of objects that are within scope;

generate a first query to retrieve objects identified in the first listing of objects from the database system;

instruct the database system via the first query to skip security measures directed to ensuring user access rights to the first objects that are within scope;

determine whether a retrieved object is cacheable;

store the retrieved object as a non-cacheable object within user device memory of the user device when the retrieved object is not cacheable;

calculate the calculated performance indicators based on the retrieved objects;

generate the GUI page containing the plurality of calculated performance indicators;

signal the user device to display the generated GUI page;

receive, from the user device, a second user request for a second GUI page containing performance indicator information regarding at least one of the calculated performance indicators;

generate a second listing of objects from the entity data containing information for use in calculating the performance indicator information regarding the at least one of the calculated performance indicators;

determine whether the second listing of objects includes the non-cacheable object that was stored in the user device memory;

filter the second listing of objects to remove any non-cacheable object that was stored in the user device memory and to identify second objects that are within scope based on the predefined user scope;

retrieve the non-cacheable object from the user device memory;

generate a second query to retrieve from the database system objects from the filtered second listing;

instruct the database system via the second query to skip security measures directed to ensuring user access rights to the first objects and the second objects that are within scope; and calculate the performance indicator information based on the objects retrieved from the second query and the non-cacheable object.

16. The server system of claim 15, wherein the controller is further configured to:

store the retrieved object in a cache associated with the database system when the retrieved object is cacheable.

17. The server system of claim 16, wherein the controller is further configured to:

generate the second GUI page containing the performance indicator information; and signal the user device to display the second GUI page.

18. The server system of claim 15, wherein the controller is further configured to:

when an object in the first listing of objects is not within scope, determine whether the object is a child object to a parent object that is within scope; and when the child object is in the first listing of objects along with the parent object that is within scope, instruct the database system to skip security measures directed to ensuring user access rights to the child object.

19. The server system of claim 15, wherein the controller is further configured to:

receive instructions from a first user who has access to the objects within scope to temporarily grant access rights to a second user who does not have access to the objects within scope; and store information indicating a temporary grant of access
rights to the second user in an access rights granted file.

20. The server system of claim 19, wherein to instruct the
database system to skip security measures directed to ensur-
ing user access rights the server component is further
configured to:

instruct the database system to skip security measures
directed to ensuring user access rights after determining
from the access granted file that a user of the user
device has been granted access to the objects within
scope.

\* \* \* \* \*